(12) United States Patent
Merchant

(10) Patent No.: US 7,377,439 B1
(45) Date of Patent: May 27, 2008

(54) PIEZOELECTRIC SCAN SYSTEM

(75) Inventor: Peter Merchant, Dorset (GB)

(73) Assignee: Symbol Technologies, Inc., Holtsville, NY (US)

( * ) Notice: Subject to any disclaimer, the term of this patent is extended or adjusted under 35 U.S.C. 154(b) by 602 days.

(21) Appl. No.: 09/546,962

(22) Filed: Apr. 11, 2000

Related U.S. Application Data

(63) Continuation-in-part of application No. 09/447,847, filed on Nov. 23, 1999, now Pat. No. 6,419,156.

(51) Int. Cl.
*G06K 7/10* (2006.01)

(52) U.S. Cl. .............................. 235/462.45; 235/462.25

(58) Field of Classification Search .......... 235/462.45, 235/462.01–462.03, 462.23, 462.25, 462.26, 235/462.46, 462.49, 454, 472.01–472.03, 235/470, 484

See application file for complete search history.

(56) References Cited

U.S. PATENT DOCUMENTS

| | | | | |
|---|---|---|---|---|
| 4,578,571 | A | * | 3/1986 | Williams ..................... 235/472 |
| 4,818,886 | A | * | 4/1989 | Drucker ...................... 250/566 |
| 5,170,277 | A | * | 12/1992 | Bard et al. .................. 359/210 |
| 5,280,164 | A | | 1/1994 | Barkan ....................... 235/467 |
| 5,521,367 | A | * | 5/1996 | Bard et al. .................. 235/462 |
| 5,559,320 | A | * | 9/1996 | Loya ...................... 235/462.39 |
| 5,625,483 | A | | 4/1997 | Swartz ....................... 359/224 |
| 5,710,418 | A | * | 1/1998 | Tawara .................. 235/462.35 |
| 5,794,023 | A | | 8/1998 | Hobbs et al. ............... 359/565 |
| 5,859,417 | A | * | 1/1999 | Dvorkis et al. ............. 235/467 |
| 5,864,128 | A | | 1/1999 | Plesko ........................ 235/462 |
| 5,932,860 | A | | 8/1999 | Plesko ........................ 235/454 |
| 5,955,721 | A | | 9/1999 | Dickson et al. ............. 235/462 |
| 6,053,409 | A | * | 4/2000 | Brobst et al. .......... 235/462.36 |
| 6,057,547 | A | * | 5/2000 | Park et al. .................. 250/307 |
| 6,234,396 | B1 | * | 5/2001 | Tawara .................. 235/472.01 |
| 6,253,619 | B1 | * | 7/2001 | Danyluk et al. .............. 73/642 |

* cited by examiner

*Primary Examiner*—Seung H Lee
(74) *Attorney, Agent, or Firm*—Amin, Turocy & Calvin, LLP

(57) ABSTRACT

A system for scanning a target is provided. A light source directs a beam of light toward piezoelectric material having an arcuate reflective surface. The reflective surface directs at least a portion of the beam of light to a beam expander, which in turn directs light onto the target. A power source provides movement in the piezoelectric material to scan at least a portion of the beam of light across at least a portion of the target. The at least a portion of the beam of light is reflected onto a photosensor to provide an electrical signal representing the reflected light. A mirror is further provided between the reflector and the target to allow scanning of a target at an angle to the system components.

19 Claims, 8 Drawing Sheets

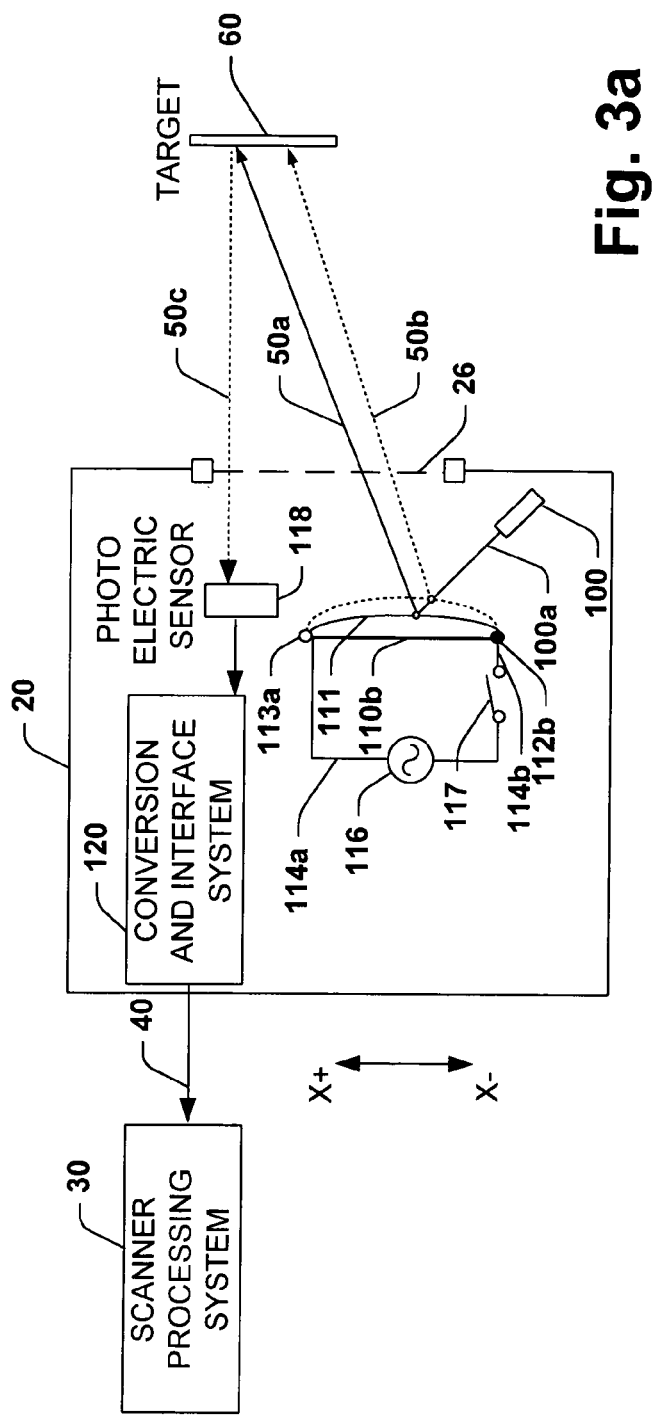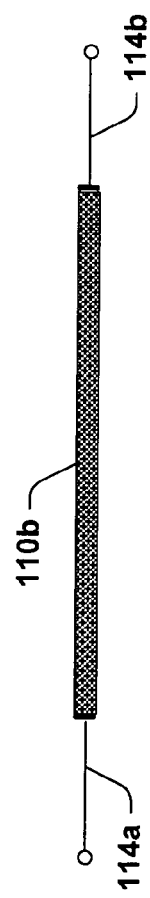

PIEZOELECTRIC SCAN SYSTEM

This application is a continuation-in-part of U.S. patent application Ser. No. 09/447,847, filed Nov. 23, 1999, now U.S. Pat. No. 6,419,156, entitled Piezoelectric Scan Engine in PC Card Format, the entirety of which is incorporated herein by reference.

FIELD OF THE INVENTION

The present invention generally relates to a system and method for scanning and reading bar codes. In particular the present invention relates to a low-cost, one-dimensional scanner and reader which may be economically implemented on a PC card or hand-held scanner.

BACKGROUND OF THE INVENTION

Bar code scanning and reading devices provide one of the great technological innovations of modern times. From quick check-outs in the grocery store to accurate inventory control for businesses, scanners/readers provide almost instantaneous computer recognition and documentation of various items while greatly relieving humans of mundane tasks thereby saving time and effort. Bar codes are typically vertical black and white bars that are scanned in a sequential fashion. In order for a computer to interpret a bar code, a scanner generally illuminates the bar code with a beam of light in a sequential, straitline fashion, while concurrently, a reader detects whether or not a region of a bar code is black or white. Depending on order and spacing of the vertical black and white bars, a unique numerical pattern may be determined for a particular item. In most cases, the bar code scanners and readers have been combined to form one integral device to perform bar code scanning and reading simultaneously. Many styles for these devices include: hand-held gun style devices; wand-like devices; pen-like devices; and stationarily mounted devices in factories for example. In fact, a vast array of styles, shapes, and sizes of devices exist to provide for many diverse bar code applications.

Over the years, fairly complicated and elaborate mechanisms have evolved to scan bar codes. In order to produce a straitline, sequential scan pattern across the face of a bar code, many scanners employ rotating components to deflect a beam of light from one end of the bar code to another. In many conventional systems, the rotating components may be rotating mirrors that deflect a continuous light beam across the bar code as the mirror is rotated in front of the light beam. In other systems, the beam of light itself may be rotated while focusing the light directly on the bar code. Many times, motors and other electro-mechanical devices are employed to rotate the mirrors and/or lights. Unfortunately, mechanical components such as motors and rotating mirrors tend to wear over time which may ultimately produce mechanical failures in the scanners.

Other techniques have evolved which employ electronic systems to cause a light beam to move across a bar code. While solving some of the aforementioned problems with moving mechanical components, many of these electronic systems are fabricated by employing elaborate processes and materials. Also, many conventional electronic systems employ complicated geometrical shapes and structures to achieve desired scanning results.

Consequently, there is a strong need in the art for a system and/or method for bar code scanning that requires minimal components and fewer manufacturing processing steps as compared to that which is conventionally available.

SUMMARY OF THE INVENTION

The present invention provides a low cost one-dimensional scanning and detecting system for reading bar codes and other related symbols. The system employs an electronic scanning and detecting system which may be implemented on a small printed circuit board such as a PCMCIA card or in a hand-held scanning and detecting system. In a PCMCIA card implementation, the bar code may be analyzed and digitized locally on the PCMCIA card before being sent over a PCMCIA bus to a hand-held or standalone personal computer (PC). Alternatively, the PCMCIA card may convert the analog bar code information and send the information to the PC for appropriate computer analysis and storage. Also, since electronic scanning and receiving systems are employed, the scanning and receiving systems may be applied to small, self-contained, hand-held applications such as may be seen in a check out line for example.

More particularly, the present invention employs a piezoelectric material that is uniquely shaped to provide a non-mechanical, low cost scanning system. In particular, the present invention geometrically exploits an arcuate piezoelectric structure that allows for a small, discrete printed circuit board implementation of a one-dimensional bar code scanning and reading system. This allows, as discussed above, for a PCMCIA card implementation which provides bar code scanning in a hand-held computer application. The present invention may be implemented with lower component and manufacturing costs than conventional systems.

According to one particular aspect of the present invention, a system is provided for scanning a target. The system includes a light source for directing a beam of light to a reflector with a piezoelectric material having an arcuate reflective surface for receiving at least a portion of the beam of light. The reflective surface directs at least a portion of the beam of light to the target, and a power source provides movement in the radially-arced piezoelectric material to scan at least a portion of the beam of light across at least a portion of the target. The at least a portion of the target is reflected onto a photosensor to provide an electrical signal representing the reflected light.

According to another aspect of the present invention, a system is provided for scanning and reading a target. The system includes: means for directing a beam of light; means for reflecting at least a portion of the beam of light to the target; means for providing movement in an arcuate piezoelectric material to change the shape of the reflecting means which effects scanning of at least a portion of the beam of light across at least a portion of the target; and means for providing an electrical signal representing the reflected light.

According to still yet another aspect of the present invention, a method is provided for scanning and reading a target. The method includes directing a beam of light to a piezoelectric material having a convex arcuate reflective surface, at least a portion of the beam of light being thereby received at the target. The method further includes applying at least one predetermined voltage to the piezoelectric material so as to cause the reflective surface to change shape. This results in scanning of at least a portion of the beam of light along the target. Finally, at least a portion of the beam of light from the target is received at a sensor which provides an electrical signal representing the received light.

According to still yet another aspect of the present invention, a system is provided for scanning and reading a target. Included is a system for directing a beam of light and a system for providing movement in an arcuate piezoelectric material having a reflective surface. This effects scanning of at least a portion of the beam of light across at least a portion of the target. Also provided is a system for providing an electrical signal representing the reflected light.

According to yet another aspect of the present invention, a system is provided for scanning and reading a target. The system includes a light source for directing a beam of light and a piezoelectric material affixed to an arcuate reflective surface for receiving at least a portion of the beam of light. The reflective surface directs at least a portion of the beam of light to the target. An AC voltage source is provided for selectively applying predetermined voltages to the piezoelectric material. This causes the reflective surface to change shape resulting in scanning at least a portion of the beam of light across at least a portion of the target. In addition, at least a portion of the beam of light reflected from at least a portion of the target is reflected onto a photosensor to provide an electrical signal representing the reflected light.

According to still yet another aspect of the present invention, a PCMCIA card is provided for scanning a bar code. The PCMCIA card includes a light source for directing a beam of light and a piezoelectric material having an arcuate reflective surface for receiving at least a portion of the beam of light. The reflective surface directs at least a portion of the beam of light to the bar code. A voltage source is provided for selectively applying predetermined voltages to the piezoelectric material thereby causing the reflective surface to change shape resulting in scanning at least a portion of the beam of light across at least a portion of the target. The bar code reflects at least a portion of the beam of light to a photo sensor which in turn provides an electrical signal representing the reflected light. A conversion and interface system is also provided for transmitting a digital representation of the electrical signal across a PCMCIA bus to a scanner processing system to interpret the bar code.

According to yet another aspect of the present invention, there is provided a system and method for scanning a target. The system includes a light source, a reflector having a variable shape arcuate reflective surface, and a beam expander. The reflector controllably reflects light from the light source and onto the beam expander, which in turn reflects light onto the target being scanned. The method includes providing a reflector having a variable arcuate reflective surface, a beam expander, and a beam of light. Light is then reflected off the reflector and onto the beam expander. In addition, light from the beam expander is reflected onto the target. The shape of the reflector is varied to effect a scanning of the target.

According to still another aspect of the present invention, a target scanning apparatus is provided including a housing with an aperture, a scanning circuit, and a mirror adapted to reflect scanning light from the scanning circuit, through the housing aperture, and onto the target. In this regard, the mirror may have a convex arcuate reflecting surface to expand the reflected light beam.

To the accomplishment of the foregoing and related ends, the invention, then, comprises the features hereinafter fully described. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIG. 3a is a schematic block diagram of another embodiment of a piezoelectric scan apparatus in accordance with the present invention;

FIG. 3b is detailed drawing of another embodiment for a piezoelectric material in accordance with the present invention;

FIG. 7b is a detailed side view of the embodiment of FIG. 7a;

DETAILED DESCRIPTION OF THE INVENTION

Figure 1:
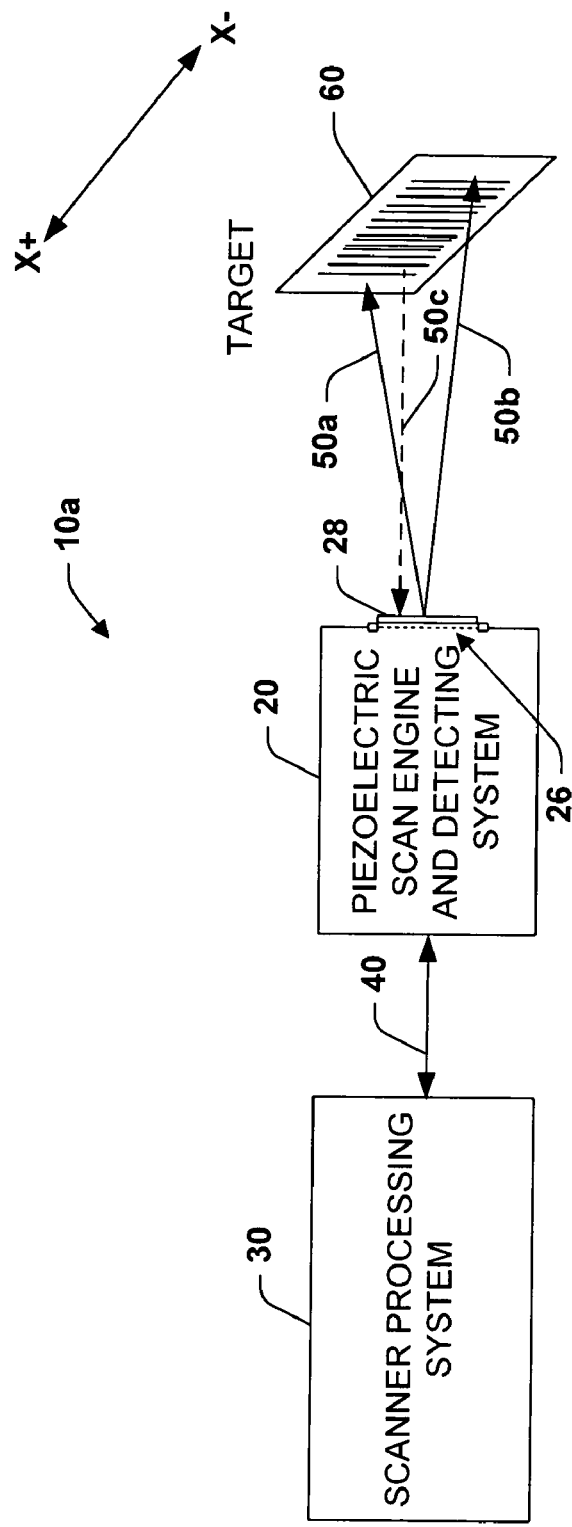
FIG. 1 is a schematic block diagram of a scanning and reading system in accordance with the present invention.

The present invention will now be described with reference to the drawings, wherein like reference numerals are used to refer to like elements throughout.

The present invention provides a novel and easy to implement system for small or hand-held bar code scanning applications. Applications for scanning and receiving bar codes are virtually unlimited, and the present invention provides a straight-forward, low cost approach for processing these applications.

Referring initially to FIG. 1, a scanning system 10a is shown which includes a piezoelectric scan engine and detecting system (PSD) 20 operatively coupled to a scanner processing system 30 via a system bus 40. The PSD 20 projects a light ray 50a through an aperture window 26 and a focusing system 28 on to a bar code target 60. As shown, the bar code target 60 (e.g., a sequence of vertical black and white bars) is scanned from an X+ direction (depicted as light ray 50a) to an X− direction (depicted as light ray 50b). It is to be appreciated that scanning may also take place in the opposite direction. As will be described in more detail below, the PSD 20 includes a radially-arced piezoelectric material having a variable deflection angle for directing light to targets. By geometrically shaping the piezoelectric material, scanning may be achieved with minimal materials and mounting structures.

A plurality of light rays 50c (one ray is shown for simplicity) reflect from the target 60 back through the focusing system 28 on the PSD 20. The focusing system 28 may be a single optical lens system for directing and receiving light or may include a separate directing and receiving lens for sending and receiving light to and from the target 60. Focusing systems are well known in the art, therefore, further discussion related thereto is omitted for the sake of brevity.

The PSD 20, receives a light ray 50*c* and converts the ray to an electrical signal. The electrical signal is digitized and sent over the system bus 40 to the scanner processing system 30 for analysis and storage. It is to be appreciated that signal processing and analysis may take place at the PSD 20, or the scanner processing system 30, or shared between the two systems. The scanner processing system 30 may provide a plurality of application software systems to process the bar code information. The application software systems may include: accounting controls; inventory controls; pricing information; location information; and other information and/or functions suitably relevant to the items being scanned. In the preferred embodiment, the system bus 40 is a PCMCIA bus coupled to a hand-held personal computer. PCMCIA buses provide a high-speed standard access mechanism to share and exchange information with most personal computers and are employed by the present invention to transmit bar code information from the PSD 20 to the scanner processing system 30.

Figure 2A:
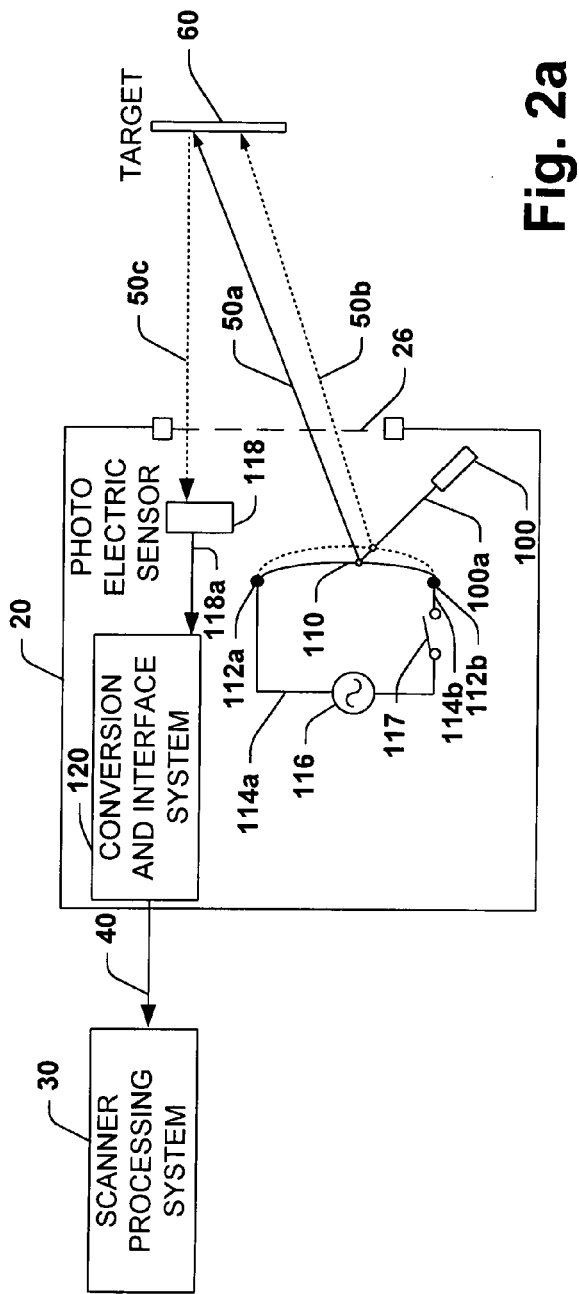
FIG. 2a is a schematic block diagram of a piezoelectric scan apparatus in accordance with the present invention.

FIG. 2*a* depicts a top view of a target 60 which is scanned by the PSD 20. A light source 100 is directed at a radially-arced surface 110*a* of piezoelectric material 110 which may be about two millimeters thick and approximately ten millimeters in length. The light source 100 is stationarily mounted at a fixed angle while projecting light 100*a* at the surface 110*a*. Preferably, the light source 100 is a laser diode, although other light sources may be employed.

The piezoelectric material 110 is mounted in the form of a radially defined arc at non-movable fixed locations 112*a* and 112*b*. Affixed to the piezoelectric material 110 are electrodes 114*a* and 114*b* which are connected to an AC power source 116. When the AC power source is applied to the piezoelectric material 110, the radially defined arc of the piezoelectric material 110 is caused to expand and/or contract in a radially defined direction as depicted by the dotted line in FIG. 2*a*. The frequency of the AC power source 116 may be a plurality of frequencies ranging from a few Hertz to several kilohertz depending on the desired scan rate of the target 60. Sinusoidal or triangular waveforms may be employed by the AC source to provide a cyclical movement of the piezoelectric material 110. As the material 110 expands and contracts, the radially-arced surface 110*a* increases and decreases in a radial direction to and from the light source 100. Since the piezoelectric material 110 is geometrically formed as a radial-arc, a deflection angle is created which directs light 100*a* toward the target 60. As the arc expands and contracts with the applied power, the deflection angle for the approaching light 100*a* changes causing light rays 50*a* and 50*b* to appear at the target 60 at different points. It is to be appreciated that many different points on the target are scanned based on the variable deflection angle of the radially-arced surface 110*a*. Only two light rays are shown for ease of illustration. As will be described in more detail below, the radially-arced surface 110*a* is polished to provide a reflecting radial surface to direct the light 100*a* toward the target 60.

As the target 60 is scanned by the deflecting radially-arced surface 110*a*, light rays 50*c* are directed through an aperture 26 (e.g., a translucent window consisting of a plurality of colors) toward a photoelectric sensor 118. Preferably, the sensor 118 is a photosensitive addressable array for providing pixel data in relation to the position of light received from the target 60. The photoelectric sensor 118 converts the received light rays to an electrical signal 118*a* which is provided to a conversion and interface system 120. As will be described in more detail below, the conversion and interface system 120 is responsible for digitizing the electrical signal 118*a* and transferring binary information representing bar code data via system bus 40 to the scanner processing system 30. A trigger switch 117 is shown interrupting the AC source 116 to the piezoelectric material 110. The trigger switch 117 allows a user to actively scan the target 60 when the switch 117 is engaged.

Figure 2B:
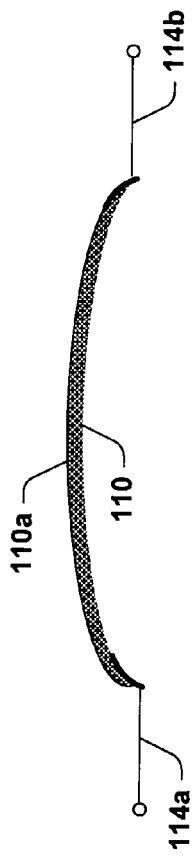
FIG. 2b is detailed drawing of a piezoelectric material in accordance with the present invention.

Now referring to FIG. 2*b*, a detailed drawing of the radially-arced piezoelectric material 110 is shown. The piezoelectric material 110 has a polished surface 110*a* for reflecting light toward the target 60. Polishing may be achieved by applying well known chemical or mechanical processes on the surface 110*a*. It is also to be appreciated that a metallic layer (e.g., metallic foil) could be attached to the surface of the piezoelectric material to provide a reflecting surface. As shown, electrodes 114*a* and 114*b* are attached to a first and second end of a single layer of piezoelectric material 110. When voltage is applied to the ends of the material as shown in FIG. 2*a*, the curvature of the formed arc changes because of an elongation in the crystalline structure of the piezoelectric material 110. A plurality of various piezoelectric materials may be employed as long as the crystalline structure of the material is conformable to an arc and is suitable for polishing. By forming an arc to provide a deflection angle, the present invention provides several advantages over conventional systems. For example, the arc provides a variable deflection angle from a single layered piezoelectric material. A small movement in the arc allows for a wide deflection pattern on the target 60. This provides a wide-angle deflection system formed from a single layer of low cost piezoelectric material. Many conventional systems, employ multiple layers of material or rely on complicated structures in order to produce the necessary deflection angles. Another advantage of the radially formed arc is that scanner manufacturing costs may be reduced since the low cost piezoelectric material is readily mounted to a printed circuit board at two fixed locations 112*a* and 112*b*.

Figure 4A:
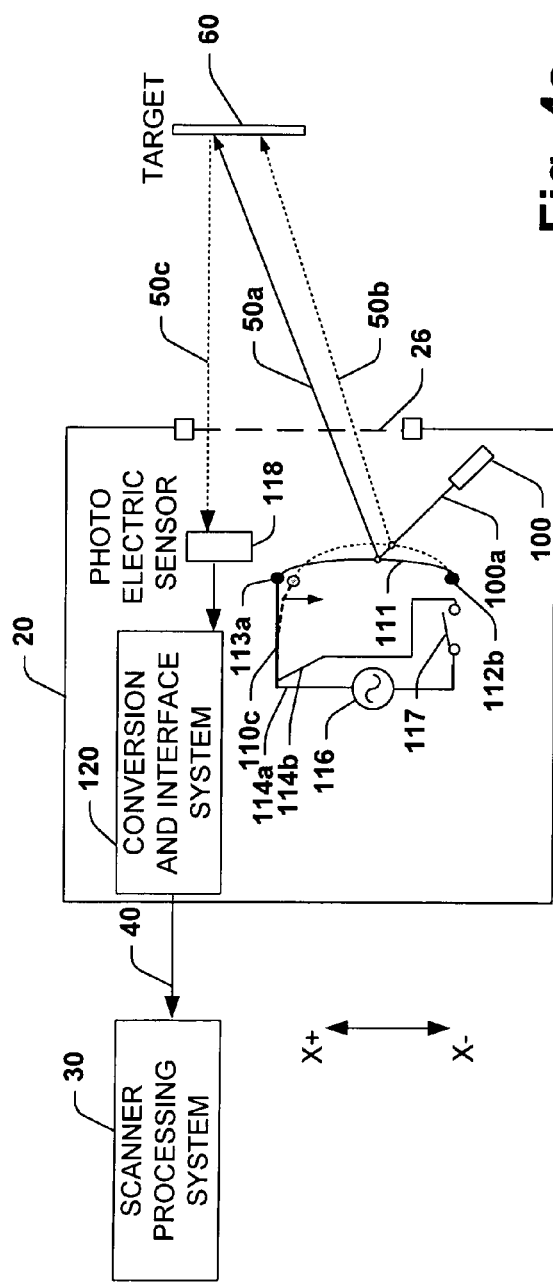
FIG. 4a is a schematic block diagram of another embodiment of a piezoelectric scan apparatus in accordance with the present invention.
Figure 4B:
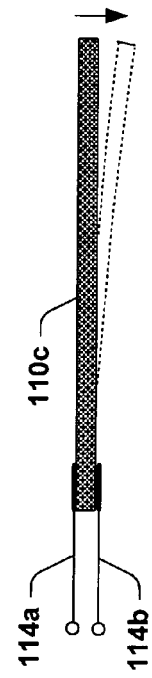
FIG. 4b is detailed drawing of another embodiment for a piezoelectric material in accordance with the present invention.

Turning now to FIG. 3*a*, another aspect of the present invention is illustrated. According to this aspect, the piezoelectric material 110*b* is formed as a straightened single layer with electrodes 114*a* and 114*b* attached at opposing ends as shown in FIG. 3*b*. A metallic reflective foil 111 is radially formed and attached to both ends of the piezoelectric material 110*b*. As shown in FIG. 3*a*, one end of the piezoelectric material 110*b* is stationarily fixed at point 112*b*. The other end of the piezoelectric material is free to move at point 113*a* in the +X or −X direction. As an AC voltage 116 is applied, the piezoelectric material lengthens and contracts in a straight line causing the radially formed arc in the metallic foil to radially deflect inward or outward. As described above, when the radially formed metallic arc moves, a variable deflection angle is provided to direct the light 100*a* to the target 60. It is to be appreciated that many embodiments for deploying a radially-arced deflection system are possible. For example, referring to FIG. 4*a* and FIG. 4*b*, another aspect of the present invention is illustrated. A piezoelectric material 110*c* is shown in FIG. 4*b*, with electrodes 114*a* and 114*b* at the same end of the material. When a voltage is applied to the piezoelectric material 110*c*, a bend may occur in the direction of the arrow toward the dotted line as shown, for example. Bends may occur in the opposite direction if an opposite polarity voltage is applied. As shown in FIG. 4*a*, a metallic foil is attached to a fixed point 112*b* and to one end of the piezoelectric material 110*c*. When the AC voltage source 116 is applied to the piezoelectric material 110c, a bend occurs in the +X and −X direction causing the metallic foil 111 radius to increase or decrease. As described above, when the radially formed arc 111 changes due to the applied voltage, a variable deflection angle surface is formed which directs light 100a to the target 60.

Figure 5:
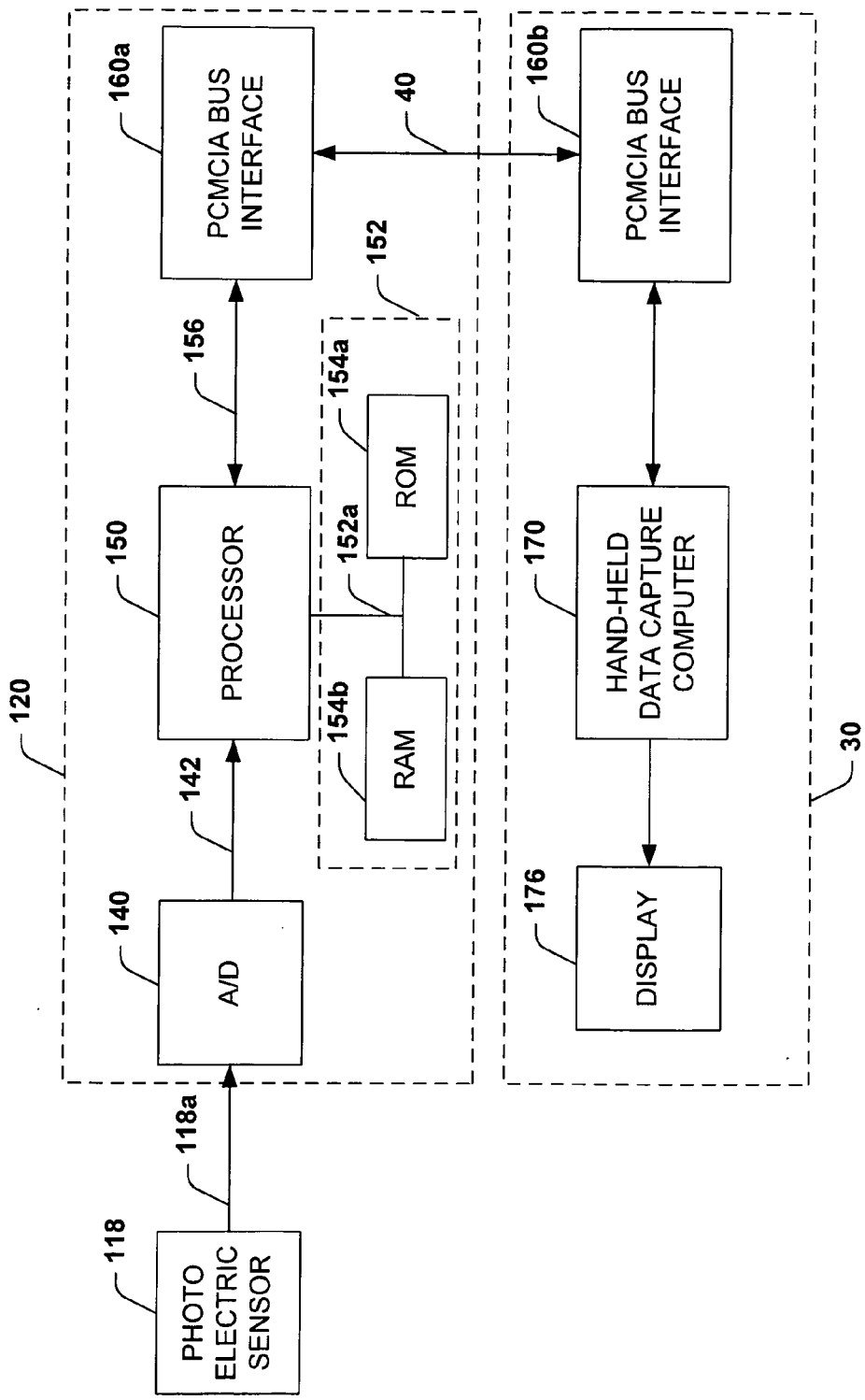
FIG. 5 is a schematic block diagram of a conversion and interface system coupled to a scanner processing system in accordance with the present invention.

Referring now to FIG. 5, a conversion and interface system 120 is shown operatively coupled to the scanner processing system 30 via the PCMCIA system bus 40. As shown, an electrical output signal 118a from the photoelectric sensor 118 is coupled to the input of an analog to digital (A/D) converter 140, which converts the analog signals provided by the photoelectric sensor 118 to digital form. As described above, the photoelectric sensor 118 is an addressable array. Address lines (not shown) from the conversion and interface system 120, direct target image pixel data from the photoelectric sensor 118 to the A/D converter 140. The A/D 140 provides binary codes to a processor 150 which controls the general operation of the interface system 120 and provides addressing for the photoelectric sensor 118. The binary codes represent the scanned black and white bars from the target and generally represent pixel intensity from the photoelectric sensor 118.

The processor 150 is programmed to control and operate various components within the conversion and interface system 120 in order to carry out the various functions described herein. The processor or CPU 150 can be any of a plurality of processors, such as the p24T, Pentium 50/75, Pentium 60/90, and Pentium 66/100, Pentium PRO, and Pentium 2, and substantially any other similar or compatible processors. The manner in which the processor 150 can be programmed to carry out functions relating to the present invention will be readily apparent to those having ordinary skill in the art based on the description provided herein.

A memory 152 tied to the processor 150 via bus 152a is also included in the conversion and interface system 120 and serves to store program code executed by the processor 150 for carrying out operating functions of the system 120 as described herein. The memory 152 also serves as a storage medium for temporarily storing information such as historical inventory bar code data and the like. The memory 152 is adapted to store a complete set of information to be transmitted to the scanner processing system 30. Preferably, the memory 152 has sufficient capacity to store multiple sets of bar codes and other information, and the processor 150 could include a program for alternating of cycling between various sets of previously stored bar code information. In this way, pricing and inventory analysis, for example, may occur as the bar code is scanned in. It is to be appreciated, however, that bar code information may be passed to the scanner processing system 30 where equivalent or additional processing may occur.

The processor 150 is coupled to a PCMCIA bus interface system 160a via internal bus 156. The PCMCIA bus interface system 160a provides the interface to the PCMCIA bus 40 and ultimately allows the conversion and interface system to communicate with the scanner processing system 30. PCMCIA bus interface systems 160a may include Application Specific Integrated Circuits (ASIC) or may employ off the shelf components which are commercially available from several suppliers. In general, PCMCIA bus interface systems are well known in the art and may be readily implemented by one of ordinary skill in the art.

As shown in FIG. 5, the scanner processing system 30 communicates with the conversion and interface system 120 over the PCMCIA bus 40. The scanner processing system 30, preferably, is a hand-held data capture computer 170 having a PCMCIA bus interface system 160b. The hand-held computer 170 may be any suitable commercially available personal computer having a PCMCIA bus interface and may include a display 176 for viewing bar codes and other related information. A hand-held computer is preferably employed so that a user may perform hand-held bar code scanning by inserting a PCMCIA card scan engine as shown in FIG. 1 into a PCMCIA slot of the hand-held computer. It is to be appreciated; however, that the present invention is not limited to the embodiments disclosed herein. The scanner, conversion, and hand-held systems may be combined, for example, to form an integrally contained monolithic system. A significant advantage of the present invention is that the scan engine may be implemented with small, non-moving components. Thus, virtually any suitable computing or processing system and/or environment may be employed to carry out the present invention.

Figure 6:
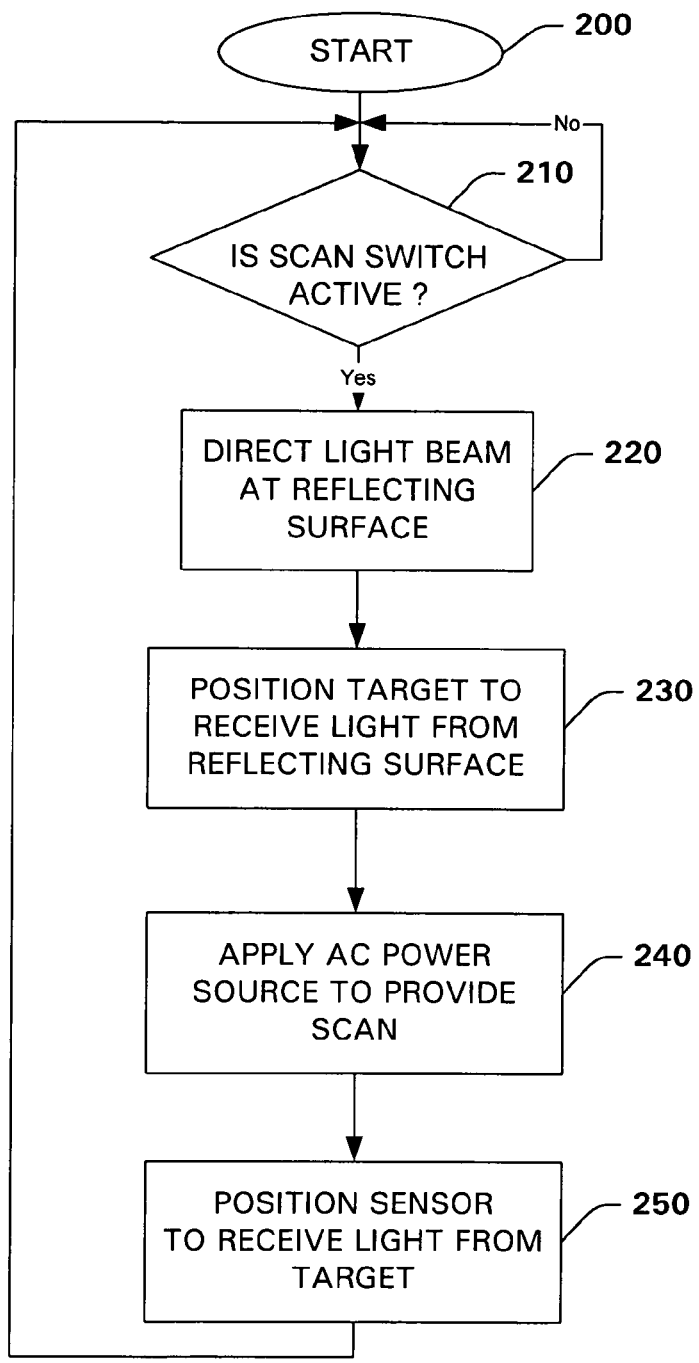
FIG. 6 is a block diagram methodology in accordance with the present invention.

Now referring to FIG. 6, a block diagram methodology is provided for carrying out the present invention. Beginning at step 200, various processor initialization tasks and background activities are performed as power is applied to the scanner processing system and the conversion and interface system. After these tasks are performed the method proceeds to step 210. At step 210, the method determines if a user has activated a scan switch. If not, the method remains in a loop at step 210 and all power is withheld from the scan engine. If a user has activated the scan switch, the method proceeds to step 220.

At step 220, a light beam is energized and directed at a reflecting surface of a radially-arced piezoelectric material. After directing the light beam, the method proceeds to step 230. At step 230, a target (e.g., bar code) is generally positioned to receive at least a portion of the beam of light from the reflecting surface of the piezoelectric material. After positioning the target, the method proceeds to step 240. At step 240, AC power is applied to the radially-arced piezoelectric material. As described above, the AC power source causes the radial surface of the piezoelectric material to produce a variable deflection angle for the light beam. As the deflection angle is varied, the light beam is scanned across the target and the method proceeds to step 250. At step 250, a photo sensor is generally positioned to receive light from the target. The photosensor converts the received light to an electrical signal representing the received light. After the target is completely scanned, the method proceeds back to step 210 to determine if another scan sequence should occur by monitoring the user scan switch.

Figure 7A:
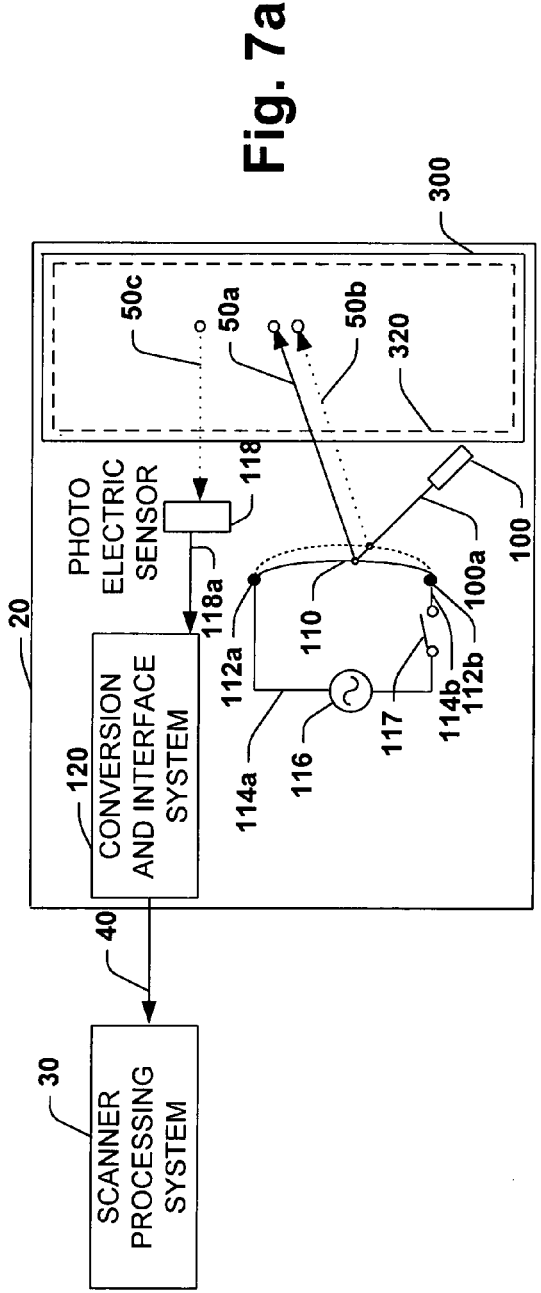
FIG. 7a is a schematic block diagram of another embodiment of a piezoelectric scan apparatus in accordance with the present invention.
Figure 7B:
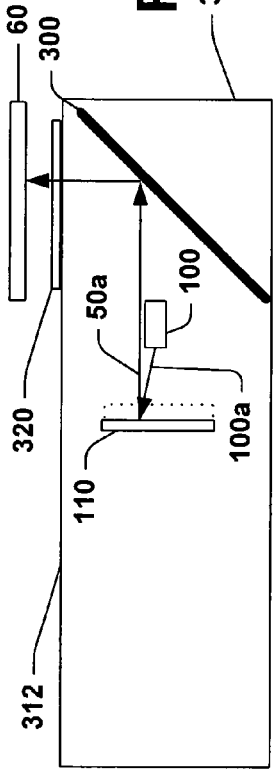
Figure 7C:
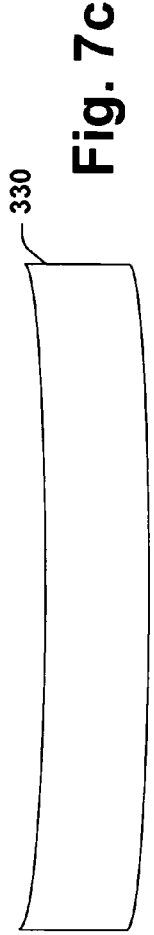
FIG. 7c is a partial side view of another embodiment of a piezoelectric scan apparatus in accordance with the present invention.

Referring now to FIGS. 7a and 7b, a PSD 20 is shown similar to that of FIG. 2a. A mirror 300 is provided at an angle for reflecting light ray 50a from surface 110a of the piezoelectric material 110 upward through an aperture 310 in the top surface 312 of the housing 314, and a corresponding window 320, and onto the target 60. In this embodiment, the target 60 is located above the window 320, and the mirror 300 is mounted at a 45 degree angle to the horizontal in order to reflect the light ray 50a upward. However, it will be recognized that other embodiments are possible where, for example, a vertical mirror could be employed to reflect ray 50a horizontally to one side or the other of housing 314 where appropriate corresponding apertures and windows are provided therein. In this fashion, a standard scanning circuit may be employed in a given orientation with respect to the housing, with different configurations of apertures, windows, and mirrors to effect scanning of targets at any orientation relative to the housing 314. It will be further appreciated that other embodiments of mirror 300 are possible where the reflective surface thereof is non-planar, as shown in FIG. 7c. In this regard, a convex arcuate mirror 330 may be provided in order to expand the light ray 50a from the piezoelectric reflector 110 for scanning the target 60.

Figure 8:
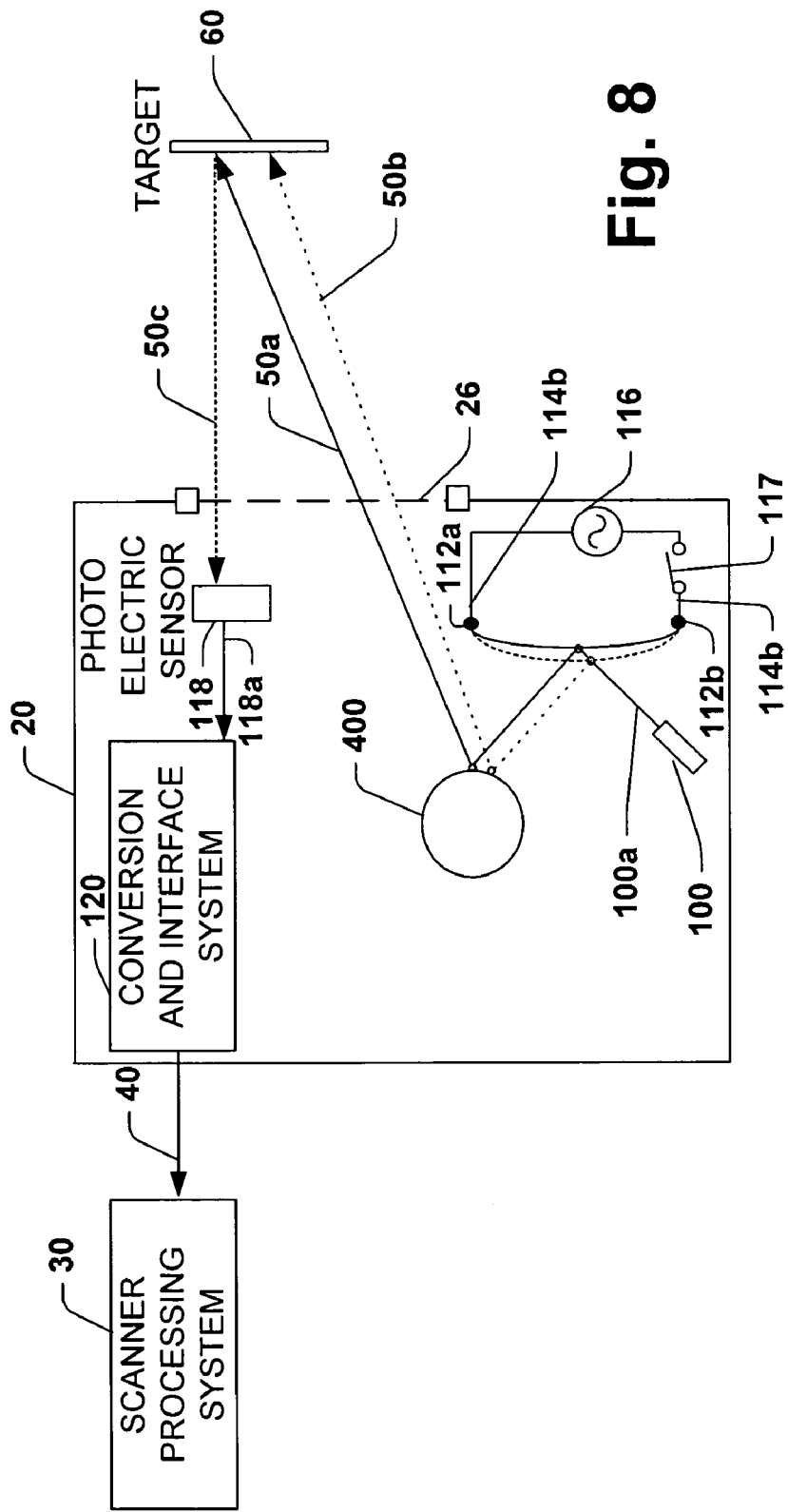
FIG. 8 is a schematic block diagram of another embodiment of a piezoelectric scan apparatus in accordance with the present invention.

Referring now to FIG. 8, another embodiment of the present invention is shown which is similar to that show in FIG. 2a with the addition of a cylindrical beam expander 400. Expander 400 is preferably a polished round pillar located in a fixed location relative to the piezoelectric material 110, light source 100, and aperture window 26. The arcuate reflective outer surface 410 provides for an expansion of the light ray 100a from source 100 thereby further amplifying the scanning field size achievable with a piezoelectric material 110 which itself may have a fixed maximum displacement. In this regard it will be recognized that the expander 400 may alternatively have a spherical reflective outer surface in order to achieve two-dimensional expansion of ray 100a. It will also be appreciated that one or more lenses, not shown, may alternatively be used to effect expansion of the scanning beam displacement.

Those skilled in the art will recognize that the embodiment(s) described above and illustrated in the attached drawings are intended for purposes of illustration only and that the subject invention may be implemented in various ways. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

Having thus described the invention, the following is claimed:

1. A system for scanning a target, comprising:
a light source providing a light beam;
a reflector having an arcuate reflective surface with a variable shape;
a shape controlling system for controlling the shape of the reflector;
a beam expander with a generally cylindrical reflective outer surface; and
the reflector reflecting a first portion of the light beam from the light source onto the beam expander, the beam expander reflecting at least a second portion of the first portion of the light beam onto the target, and the shape controlling system selectively varying the shape of the reflector, whereby the second portion scans across at least a portion of the target.

2. The system of claim 1, further including a photo sensor, wherein the target reflects at least a portion of the second portion of light onto the photo sensor and the photo sensor generates an electrical signal representative of the at least a portion of the second portion of light.

3. The system of claim 2, further including a conversion and interface system receiving the electrical signal from the photo sensor and converting the electrical signal to a digital code.

4. The system of claim 1, the reflector includes a piezoelectric material with an arcuate reflective surface.

5. The system of claim 1, the shape of the reflector is generally radial.

6. The system of claim 1, the shape controlling system provides a voltage signal to the piezoelectric material, and the shape of the reflector is varied according to the voltage signal.

7. The system of claim 6, the shape of the reflector is generally radial.

8. The system of claim 7, the beam expander has a generally spherical reflective outer surface.

9. The system of claim 7, the beam expander includes a convex arcuate reflective surface.

10. The system of claim 7, further including a photo sensor, wherein the target reflects at least a portion of the second portion of light onto the photo sensor and the photo sensor generates an electrical signal representative of the at least a portion of the second portion of light.

11. The system of claim 10, further including a conversion and interface system receiving the electrical signal from the photo sensor and converting the electrical signal to a digital code.

12. The system of claim 1, the beam expander includes a convex arcuate reflective surface.

13. A method of scanning a target, comprising the steps of:
providing a reflector having an arcuate reflective surface with a variable shape;
providing a beam expander with a cylindrical reflective outer surface;
providing a light beam from a light source to the reflector;
reflecting a first portion of the light beam off of the reflector and onto the beam expander;
reflecting a second portion of the light beam off of the beam expander and onto the target; and
varying the shape of the reflector, thereby scanning at least a portion of the target with the second portion of the light beam.

14. The method of claim 13, further including providing a control system with a control signal, wherein the shape of the reflector varies according to the control signal.

15. The method of claim 14, the reflector includes a piezoelectric material having at least two electrodes, and said shape varies according to the voltage across said electrodes.

16. The method of claim 14, the beam expander includes a convex arcuate reflective surface.

17. The method of claim 13, the beam expander has a generally cylindrical reflective outer surface.

18. A target scanning apparatus, comprising:
a housing having generally horizontal top and bottom sides, generally vertical left and right sides, the sides extending longitudinally between generally vertical front and rear ends;
a scanning system mounted in the housing and having a reflector with a variable shape arcuate convex reflective surface, a light source providing a light beam to the reflector, and a control system adapted to control the shape of the reflector;
a cylindrical reflective surface displaced from the reflector in the housing near one of the front and rear ends; and
an aperture in one of the sides near the one of the front and rear ends;
the reflector reflecting a first portion of the light beam onto the cylindrical reflective surface which is oriented so as to reflect a second portion of the light beam from the reflector through the aperture and onto the target, and the control system varying the shape of the reflector whereby the second portion of the light beam scans at least a portion of the target, whereby the light beam is expanded.

19. A system for scanning a target, comprising:
means for providing a light beam;
reflector means for reflecting a first portion of the light beam;
expander means for reflecting a second portion of the light beam from the reflector means onto the target, the expander means comprising a polished round pillar having a cylindrical reflective outer surface; and
means for varying the shape of the reflector means, by which at least a portion of the target is scanned with the second portion of the light beam.

* * * * *

UNITED STATES PATENT AND TRADEMARK OFFICE
CERTIFICATE OF CORRECTION

| | |
|---|---|
| PATENT NO. | : 7,377,439 B1 |
| APPLICATION NO. | : 09/546962 |
| DATED | : May 27, 2008 |
| INVENTOR(S) | : Merchant |

It is certified that error appears in the above-identified patent and that said Letters Patent is hereby corrected as shown below:

In Column 7, Line 1, delete "and" and insert -- or --, therefor.

In Column 7, Line 44, delete "of" and insert -- or --, therefor.

Signed and Sealed this

Seventeenth Day of November, 2009

David J. Kappos
*Director of the United States Patent and Trademark Office*